(12) United States Patent
Haddon et al.

(10) Patent No.: US 7,723,684 B1
(45) Date of Patent: May 25, 2010

(54) CARBON NANOTUBE BASED DETECTOR

(75) Inventors: Robert C. Haddon, Riverside, CA (US);
Mikhail E. Itkis, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 339 days.

(21) Appl. No.: 11/668,826

(22) Filed: Jan. 30, 2007

(51) Int. Cl.
*G01J 5/00* (2006.01)
(52) U.S. Cl. .................................. 250/338.1
(58) Field of Classification Search ............... 250/338.1
See application file for complete search history.

(56) References Cited

U.S. PATENT DOCUMENTS

| | | | |
|---|---|---|---|
| 6,400,088 B1 * | 6/2002 | Livingston et al. | 315/94 |
| 6,528,020 B1 * | 3/2003 | Dai et al. | 422/98 |
| 6,919,730 B2 * | 7/2005 | Cole et al. | 324/715 |
| 2005/0007002 A1 * | 1/2005 | Golovchenko et al. | 313/311 |
| 2005/0040371 A1 * | 2/2005 | Watanabe et al. | 252/500 |
| 2006/0046480 A1 * | 3/2006 | Guo | 438/685 |
| 2006/0054788 A1 * | 3/2006 | Wincheski et al. | 250/214.1 |
| 2006/0097176 A1 * | 5/2006 | Szu | 250/370.08 |
| 2008/0251723 A1 * | 10/2008 | Ward et al. | 250/338.4 |

OTHER PUBLICATIONS

C.-X. Sheng, et al. "Exciton dynamic in single-walled nanotubes: Transient photoinduced dichroism and polarized emission." *Physical Review* B 71. 125427 (2005), The American Physical Society, Copyright 2005, pp. 125427-1 to 125427-1.
E. Bekyarova, et al. "Electronic Properties of Single-Walled Carbon Nanotube Networks." *J. Am. Chem. Soc. 2005*, vol. 127. (JACS Articles, Published on Web Apr. 5, 2005), American Chemical Society, Copyright 2005, pp. 5990-5995.
M. Itkis, et al. "Purity Evaluation of As-Prepared Single-Walled Carbon Nanotube Soot by Use of Solution-Phase Near-IR Spectroscopy." *Nano Letters*, vol. 3, No. 3, American Chemical Society, Copyright 2003, pp. 309-314.
A. Fujiwara, et al. "Photoconductivity in Semiconducting Single-Walled Carbon Nanotubes." *Jpn. J. Appl. Phys.* vol. 40 (2001), pp. L 1229-L 123, Part 2, No. 11B, Nov. 15, 2001, The Japan Society of Applied.
A. Mohite, et al. "Displacement current detection of photoconduction in carbon nanotubes." *Applied Physics Letters* 86, 061114 (2005), American Institute of Physics, Copyright 2005.
M. Itkis, et al. "Spectroscopic Study of the Fermi Level Electronic Structure of Single-Walled Carbon Nanotubes." *Nano Letters*, vol. 2, No. 2, American Chemical Society, Copyright 2002, pp. 155-159.
S. Niyogi, et al. "Chemistry of Single-Walled Carbon Nanotubes." *Acc. Chem. Res.* vol. 35, No. 12, American Chemical Society, Copyright 2002, pp. 1105-1113.

(Continued)

*Primary Examiner*—David P Porta
*Assistant Examiner*—Jessica L Eley
(74) *Attorney, Agent, or Firm*—Knobbe, Martens, Olson & Bear, LLP

(57) ABSTRACT

Systems and methods for designing and fabricating carbon nanotube based detectors are disclosed. In some embodiments, one or more sensor elements can be formed from a film of single-walled carbon nanotubes (SWNTs). Bolometric properties of such detectors are disclosed. In some embodiments, the film can be thermally isolated in various ways, such as suspending the film and providing a vacuum environment, to provide the bolometric properties. Various properties of the SWNT films, such as resistivity-dependence on temperature and spectral response, can be obtained by adjusting the dimension and/or composition of the film. Examples of SWNT film formation, detector element fabrication, and array fabrication are disclosed.

37 Claims, 10 Drawing Sheets

OTHER PUBLICATIONS

H. Hu, et al., "Sidewall Functionalization of Single-Walled Carbon Nanotubes by Addition of Dichlorocarbene." *J. Am. Chem. Soc.* 2003, vol. 125 (JACS Articles, Published on Web Nov. 11, 2003), American Chemical Society, Copyright 2003, pp. 14893-14900.

P. Kim, et al. "Thermal Transport Measurements of Individual Multiwalled Nanotubes" *Physical Review Letters*, vol. 87, No. 21, Nov. 19, 2001, American Physical Society, Copyright 2001, pp. 215502-1 to 215502-4.

J. Hone, et al. "Electrical and thermal transport properties of magnetically aligned single wall carbon nanotube films." *Applied Physics Letters*, vol. 77, No. 5, Jul. 31, 2000, American Institute of Physics, Copyright 2000, pp. 666-668.

Z. Wu, et al. "Transparent, Conductive Carbon Nanotube Films." *Science*, vol. 305, Aug. 27, 2004, www.sciencemag.org, pp. 1273-1276.

M. Tarasov, et al. "Carbon nanotube bolometers." *Applied Physics Letters*, vol. 90, Copyright 2007, pp. 163503-1 to 163053-3.

M. Tarasov et al., "Carbon Nanotube Based Bolometer." *JETP Letters*, Copyright 2006, vol. 84, No. 5, pp. 267-270.

M. Itkis, et al. "Bolometric Infrared Photoresponse of Suspended Single-Walled Carbon Nanotube Films." *Science*, vol. 312, Apr. 21, 2006, pp. 413-416, www.sciencemag.org.

Misewich, J.A. et al., "Electrically Induced Optical Emission from a Carbon Nanotube FET", *Science*, 300, May 2, 2003, pp. 783-786.

Freitag M., et al., "Mobile Ambipolar Domain in Carbon-Nanotube Infrared Emitters", *Phys. Rev. Lett*, 93, 2004, pp. 076803-1-4.

Barone, Paul W. et al., "Near-infrared optical sensors based on single-walled carbon nanotubes", *Nat. Mater.*, 4, 2005, pp. 86-92.

Hennrich, Frank, et al., "Preparation, characterization and applications of free-standing single walled carbon nanotube thin films", *Phys. Chem. Chem. Phys.* 4, 2002, pp. 2273-2277.

Ando, Tsuneya, "Excitons in Carbon Nanotubes", *J. Phys. Soc. Jpn.*, 66, Apr. 4, 1997, pp. 1066-1073.

Spataru, Catalin D. et al., "Excitonic Effects and Optical Spectra of Single-Walled Carbon Nanotubes", *Phys. Rev. Lett.*, 92, Feb. 20, 2004, pp. 077402-1-4.

Perebeinos, Vasili et al., "Scaling of Excitons in Carbon Nanotubes", *Phys. Rev. Lett.*, 92, Jun. 25, 2004, pp. 257402-1-4.

Wang, Feng et al., "The Optical Resonances in Carbon Nanotubes Arise from Excitons", *Science*, 308, May 6, 2005, pp. 838-841.

Matsuoka, Yukitaka et al., "Temperature dependence of photoconductivity at 0.7 eV in single-wall carbon nanotube films", *Sci. Technol. Adv. Mater.*, 4, 2003, pp. 47-50.

Fujiwara, a. et al., "Photoconductivity of single-wall carbon nanotube films", *Carbon*, 42, 2004, pp. 919-922.

Qiu, Xiaohui et al., "Photoconductivity Spectra of Single-Carbon Nanotubes: Implications on the Nature of Their Excited States", *Nano Lett*, 5, 2005, pp. 749-752.

Wang, Feng et al., "Time-Resolved Fluorescence of Carbon Nanotubes and Its Implication for Radiative Lifetimes", *Phys. Rev. Lett.*, 92, Apr. 30, 2004, pp. 177401-1-4.

Herr, S.L. et al., "Bolometric measurement of the charge-density-save gap in $TaS_3$", *Phys. Rev. B.*, 33, Jun. 15, 1986, pp. 8851-8854.

Itkis M.E. and Nad', F. Ya. "Fundamental absorption edge of the Peieris insulator of orthorhombic tantalum trisulfide", *JETP Lett.*, 39, 1984, pp. 448-451.

Artukovic, E. et al., "Transparent and Flexible Carbon Nanotube Transistors", *Nano Lett.*, 5, 2005, pp. 757-760.

Bekyarova, E. et al., "Chemically Functionalized Single-Walled Carbon Nanotubes as Ammonia Sensors", *J. Phys. Chem. B.*, 108, 2004, pp. 19717-19720.

Snow, E.S. et al. "Chemical Detection with a Single-Walled Carbon Nanotube Capacitor", *Science*, 307, Mar. 25, 2005, pp. 1942-1945.

Star, Alexander et al., "Nanoelectronic Carbon Dioxide Sensors", *Adv. Mater.*, 16, Nov. 18, 2004, pp. 2049-2052.

Zhang, Mei et al., "Strong, Transparent, Multifunctional, Carbon Nanotube Sheets", *Science*, 309, Aug. 19, 2005, pp. 1215-1219.

Kaempgen, M. et al., "Transparent carbon nanotube coatings", *Appl. Surf. Sci.*, 252, 2005, pp. 425-429.

Ajayan, P.M. et al., "Nanotubes in a Flash—Ignition and Reconstruction", *Science*, 296, Apr. 26, 2002, p. 705.

Collins, Phillip G. et al., "1/f noise in carbon nanotubes", *Appl. Phys. Lett.*, 76, Feb. 14, 2000, pp. 894-896.

Dresselhaus, M.S., Dresselhaus, G., Avouris, P., Eds., Carbon Nanotubes: *Synthesis, Structure, Properties, and Applications*, vol. 80, (Springer-Verlag, Berlin), 2001.

\* cited by examiner

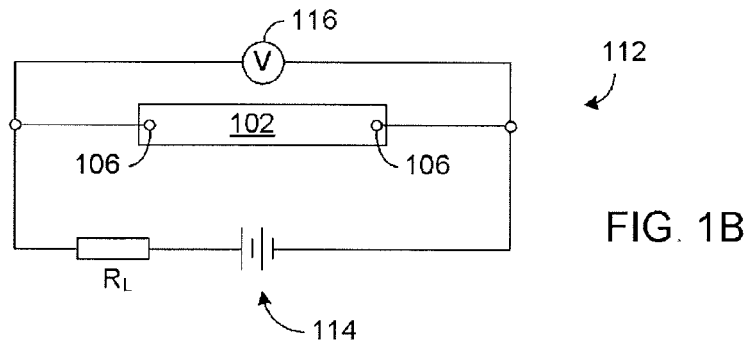
FIG. 1B
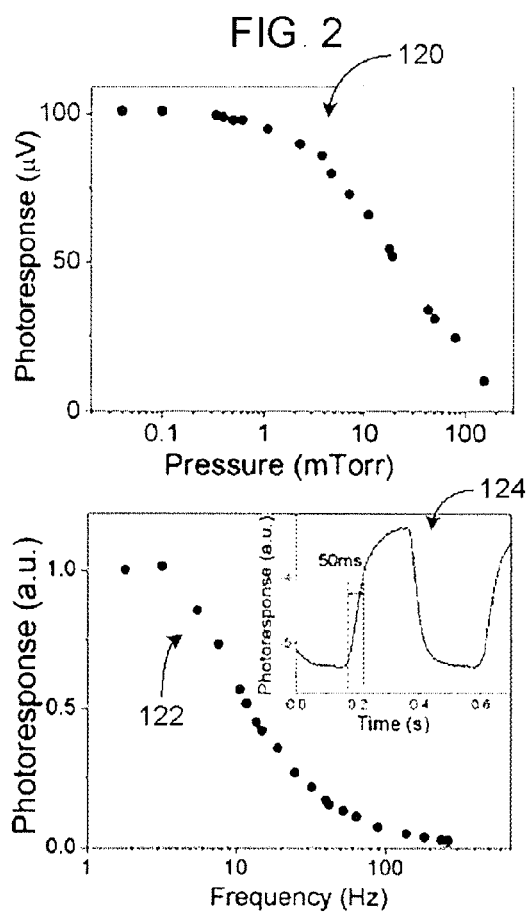
FIG. 2
FIG. 3
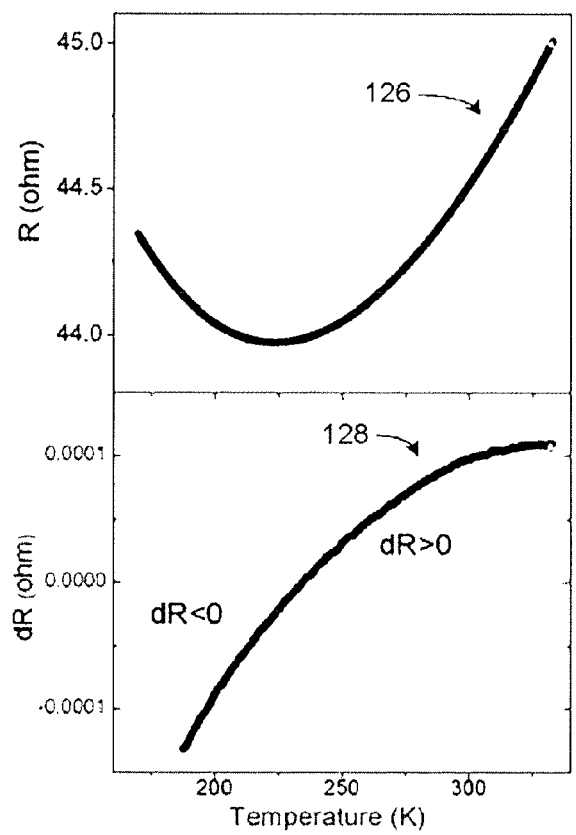
FIG. 4

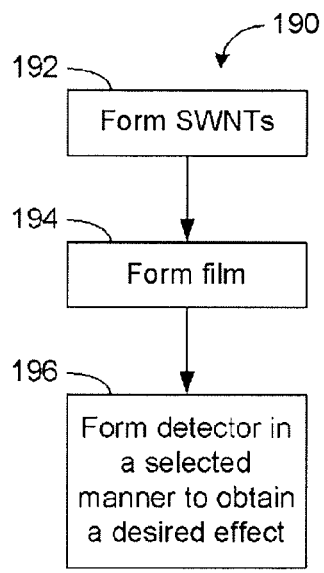
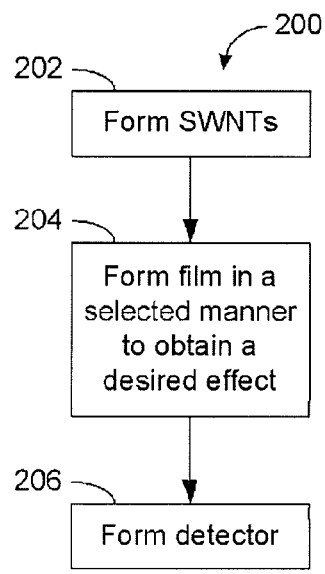
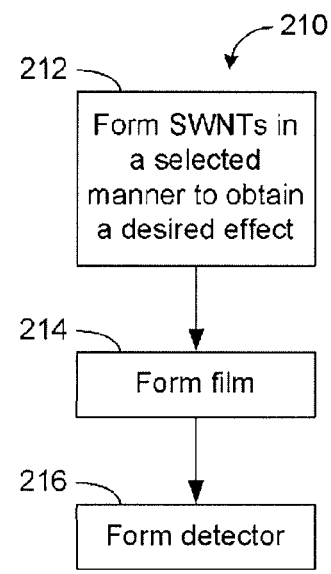
FIG. 10A  FIG. 10B  FIG. 10C
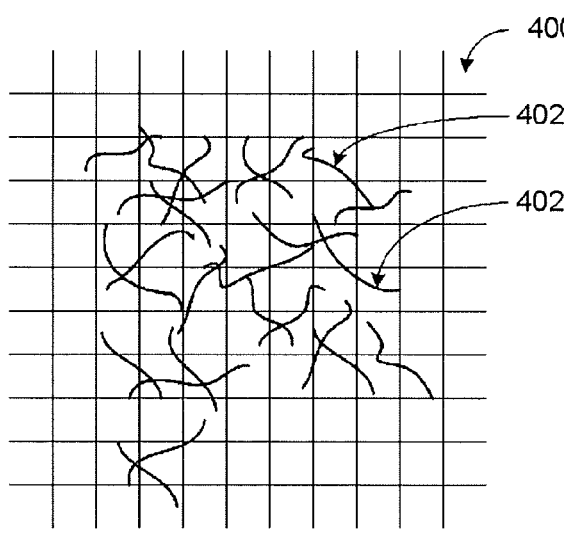
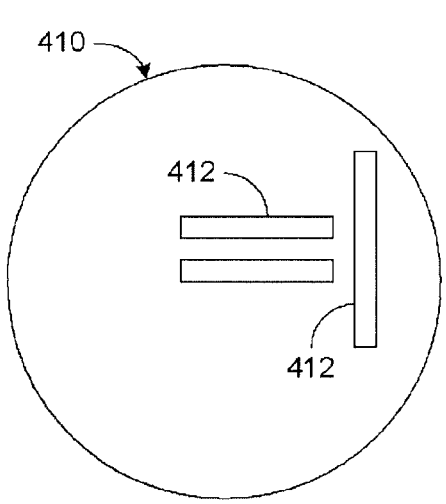
FIG. 11A  FIG. 11B

CARBON NANOTUBE BASED DETECTOR

STATEMENT OF GOVERNMENT SUPPORT

This invention was made with Government support under Grant Nos. DMEA90-02-2-0216, H94003-04-2-0404, and H94003-05-2-0504 awarded by the Department of Defense. The Government has certain rights in this invention.

BACKGROUND

1. Field

The present disclosure generally relates to carbon nanotubes, and more particularly, to systems and methods for designing and fabricating detectors using single-walled carbon nanotubes.

2. Description of the Related Art

Applications for infrared detectors and their 2-dimensional arrays have undergone a dramatic expansion over the past several decades in the areas of thermal imaging. Night vision and other military applications, spectroscopy, infrared astronomy, and failure analysis are some of the applications where infrared detectors are used.

Currently, HgCdTe is a widely used variable band gap semiconductor for infrared (IR) photodetectors. Aside from its toxicity, HgCdTe and corresponding systems have various undesirable properties. For example, processing problems can occur due to weak Hg—Te bonds, and can give rise to bulk, surface and interface instabilities that make it difficult to develop large area uniform imaging arrays. Moreover a typical HgCdTe detector operates at 77K which under certain circumstances may not be desirable.

Extrinsic doped Si detector is another type of common IR photodetector. A typical Si photodetector requires even lower temperatures (about 4.2K) for successful operation. Thus, such IR sensors (such as IR focal plane arrays (FPA)) for cryogenic imagers are typically expensive to manufacture and operate. Consequently, their uses are limited to specialized applications such as military applications.

SUMMARY

At least some of the foregoing issues can be addressed by various embodiments of systems and methods for designing and fabricating carbon nanotube based detectors. In some embodiments, one or more sensor elements can be formed from a film of single-walled carbon nanotubes (SWNTs). Such detectors can be configured to provide a bolometric response. In some embodiments, the film can be thermally isolated in various ways, such as suspending the film and providing a vacuum environment, to provide the bolometric properties. Various properties of the SWNT films, such as resistivity-dependence on temperature and spectral response, can be obtained by adjusting the dimension and/or composition of the film. Examples of SWNT film formation, detector element fabrication, and array fabrication are disclosed.

Some embodiments of the present disclosure relate to an infrared (IR) detector that includes a sensor element. The sensor element includes a thin film of single-walled carbon nanotubes (SWNTs) suspended between electrical contacts.

Some embodiments of the present disclosure relate to an infrared (IR) detector array that includes a plurality of sensor elements arranged in an array. Each sensor element includes a thin film of single-walled carbon nanotubes (SWNTs) suspended between electrical contacts.

Some embodiments of the present disclosure relate to a device that includes a film formed from a plurality of carbon nano-structures. The film is suspended between first and second electrical contacts to allow measurement of change in an electrical property of the film in response to a change in temperature of the film.

Some embodiments of the present disclosure relate to a bolometer for measuring incident energy. In some embodiments, the bolometer measures radiation power of incident radiation. The bolometer includes a detection element. The detection element includes a film formed from a plurality of single-walled carbon nanotubes (SWNTs). The bolometer further includes an electrical circuit coupled to the detection element and configured to measure a change in an electrical property of the film in response to absorption of at least a portion of the incident radiation power.

BRIEF DESCRIPTION OF THE DRAWINGS

FIG. 1B shows an example embodiment of a detector circuit that can detect a change in resistance of the SWNT film in response to the absorption of the incident radiation power;

FIG. 2 shows an example photoresponse as a function of pressure about a SWNT film, indicating its bolometric property;

FIG. 3 shows an example photoresponse as a function of modulation frequency of radiation power incident of a SWNT film, indicating its bolometric property;

FIG. 4 shows an example resistivity as a function of temperature of a SWNT film, indicating its bolometric property;

FIGS. 10A-10C show example processes that can be implemented to configure a SWNT based detector in various ways;

FIGS. 11A and 11B show examples of how strips of SWNT films can be formed;

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

Figure 1A:
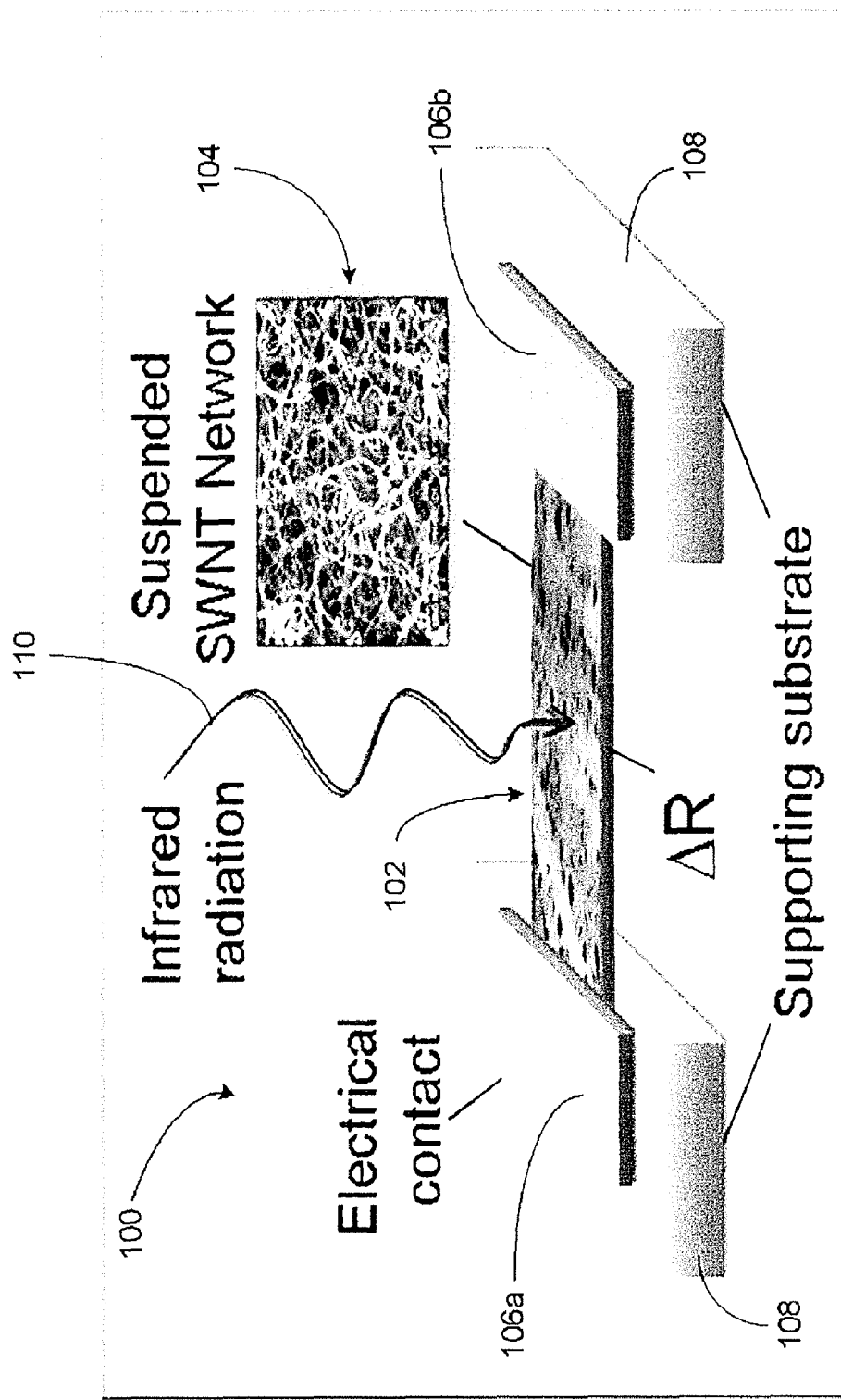
FIG. 1A shows an example embodiment of a detector element having a film formed from single-walled carbon nanotubes (SWNTs) and configured to receive and detect incident radiation power.

The present disclosure generally relates to carbon nano structures. In some embodiments, such nano structures can be utilized as to form detector elements. In some embodiments, such nano structures can include carbon nanotube structures. In some embodiments, such carbon nanotube structures can include a plurality of single-walled carbon nanotubes (SWNTs) arranged in a network so as to allow receiving of incident energy and/or radiation power and respond in a bolometric manner. For the purpose of description, "incident energy" and "incident radiation power" may be used interchangeably. For the purpose of description, "bolometric" will be understood to mean a change in temperature in the SWNT network in response to at least a partial absorption of the incident radiation power. In some embodiments, such temperature change can be measured electrically so as to function as a detector.

Various embodiments of the bolometric based detectors are described in terms of SWNTs. However, in certain embodiments, other types of nanotubes can be used. For example, some nanotube networks can include at least some nanotubes having two or more walls. In some embodiments, a bolometric detector element may be formed from double-walled carbon nanotubes.

Various embodiments of the SWNT networks are described as being in a film format. For the purpose of description, a "film" can be substantially opaque, semi-transparent, or substantially transparent. Moreover, a film can have different thicknesses. It will also be understood that other structures formed from SWNTs can also be utilized as a detector elements.

Various embodiments of the detectors are described as being infrared detectors. However, in certain embodiments, SWNT film based detectors can be configured to detect other portions of the electromagnetic radiation. In certain embodiments, SWNT film based detector can be configured to detect radiation power associated with incident particles.

Some of the non-limiting features and advantages provided by SWNT film based detectors can include efficient absorption of infrared radiation. In some embodiments, absorption coefficient of SWNTs ($\alpha=10^4$ to $10^5$ cm$^{-1}$) is comparable to that of the semiconductors usually employed in IR detectors, and the strong absorption can extend over a very wide spectral range from the UV to the far-infrared region.

Some of the non-limiting features and advantages provided by SWNT film based detectors can include bolometric response of a suspended SWNT film. Typical lifetime of the photo-carriers in SWNTs is very short ($10^{-10}$ to $10^{-14}$ s); so there is no significant steady-state photoconductivity which might be useful for practical applications. However, a SWNT film can be efficiently heated by absorption of infrared radiation when it is thermally isolated (for example, by being suspended in vacuum between electrical contacts). Bolometric response from such a configuration can provide the signal rather than the photocurrent of carriers in the conduction band. It is believed that the photo-excited carriers rapidly recombine and decay to the electronic ground state, thereby transferring their energy to phonons in the nanotube lattice and increasing the temperature of the SWNT film. Thus radiation can be detected electrically through the change of resistance of the sensitive element due to strong temperature dependence of the resistivity of certain embodiments of SWNT film.

Some of the non-limiting features and advantages provided by SWNT film based detectors can include low mass and heat capacity of the SWNT film. In an infrared bolometer, the mass of the sensitive element and its heat capacity should be minimized in order to maximize the temperature change produced by the infrared radiation in the sensor. Due to the low density the SWNT film, its mass can be extremely low (e.g., in the order of nanograms). Moreover, a SWNT film can have a high absorption coefficient, thereby making it ideal for use as a bolometric detector element.

Some of the non-limiting features and advantages provided by SWNT film based detectors can include use of a SWNT film to fabricate two-dimensional SWNT detector arrays for imaging applications. In some embodiments, a large area and substantially homogeneous SWNT film can be prepared by, for example, low-cost filtration or spraying procedures.

Some of the non-limiting features and advantages provided by SWNT film based detectors can include flexibility in the spectral range and operating temperature. In some embodiments, response in a particular spectral window can be enhanced by doping and/or chemical functionalization. In some embodiments, room temperature performance can be optimized by introducing chemical functionalities on the SWNT side-walls and open ends which modifies the intertube junctions and the temperature dependence of resistivity of the SWNT film. In some embodiments, use of films composed substantially solely of semiconducting SWNTs can result in a significant increase of the temperature coefficient of resistance. Such an increase can greatly improve the room temperature performance of the devices.

Some of the non-limiting features and advantages provided by SWNT film based detectors can include economical fabrication of high sensitivity infrared bolometers. In some embodiments, such bolometers can be configured to operate over wide and tunable spectral ranges, and/or a wide range of temperatures including room temperature (uncooled) operation.

In some embodiments, various films used for detectors (such as bolometric detectors) can be formed from SWNTs. In some embodiment, such films can also be formed from graphene nanoparticles. In some embodiment, such films can be formed from a mixture of SWNTs and graphene nanoparticles.

FIG. 1A shows an example embodiment of a detector 100 having an example film 102 formed from carbon nano structures. In some embodiments, such carbon nano structures can include single-walled carbon nanotubes (SWNTs), and such SWNTs can form a network structure so as to yield the film 102.

In some embodiments, as shown in FIG. 1A, the film 102 can be mounted to a supporting substrate 108 and electrically coupled to electrical contacts 106a and 106b. In some embodiments, the electrical contacts themselves can provide support for the SWNT network structure 102.

In some embodiments, as shown in FIG. 1A, the film 102 can be suspended between the electrical contacts 106a and 106b. As described herein, such a configuration can facilitate the bolometric response of the SWNT film 102. In some embodiments, such bolometric response is believed to be due to substantial thermal isolation of the SWNT film 102, so that heat from the absorption of radiation power yields a measurable change in temperature of the film 102 prior to the heat escaping to the surroundings. For example, heat can be lost via conduction to a supporting substrate having relatively good thermal conductivity if the structure not suspended. Instead, the heat gain can result in a change in one or more electrical properties, such as an electrical resistivity, of the SWNT film 102.

As shown in FIG. 1A, resistivity of the SWNT film 102 can change in response to absorption of energy from an incident infrared radiation 110. Such a change in resistivity can yield a change in resistance ($\Delta R$) between the electrical contacts 106a and 106b, so as to allow detection of the incident radiation 110.

It will be understood that suspension of the SWNT film 102 can be one of a number of ways of providing thermal isolation. Examples of some of the other thermal isolation techniques are described below in greater detail.

In certain embodiments, in addition to thermal isolation, relatively low heat capacity of the bolometric detector element is typically desired. A lower heat capacity allows for greater change in temperature for a given power of absorbed radiation. Thus, in certain embodiments, the SWNT film 102 can be configured to have a relatively low mass (for example, 1-100 nanograms), so as to make the film 102 more sensitive to absorptions of incident energies. When combined with thermal isolation, such low heat capacity can provide for a relatively strong bolometric response of the SWNT film 102.

FIG. 1A further shows an enlarged view 104 of the example SWNT film 102. In some embodiments, the film 102 can be formed by a network of SWNTs. An example of how such network of SWNTs can be formed into a film is described below in greater detail.

FIG. 1B shows an example embodiment of a detector circuit 112 that can be configured to allow detection of a change in resistance of the film 102 in response to its change in temperature. The film 102 can be held under a voltage bias, for example, via a voltage source 114 in series with a load resistor connected to the electrical contacts 106. The voltage across the film 102 can be monitored by a measurement component 116 such as a voltage-measuring component.

In some embodiments of the SWNT film, such as the example film 102 of FIGS. 1A and 1B, bolometric properties can be explained as follows. Due to typically very short lifetime of excited states in SWNTs (typically $10^{-10}$-$10^{-14}$ s), it is believed that photoexcited electrons and holes do not contribute directly to photoconductivity. Instead, it is believed that photo-excited carriers rapidly recombine in the electronic ground state, thereby transferring their energy to phonons propagating in the SWNT lattice and raising the temperature of the SWNT network structure. In some embodiments, such change in temperature can be detected because of the strong temperature dependence of the resistance of the SWNT network structure.

FIGS. 2-6 show, by way of examples, that various responses of the SWNT film 102 to various operating conditions indicate bolometric properties of the film, and how such properties can be selected to obtain a desired detector configuration. FIG. 2 shows an example photo-response 120 of a suspended SWNT film (for example, via the detector circuitry shown in FIG. 1B) as a function of pressure about the film. The pressure about the film can be controlled in a known manner. As shown, the particular example suspended SWNT film's response shows a strong dependence on pressure at values greater than approximately 1 mTorr. It is believed that such a decline in the response of the suspended SWNT film is due to increase in heat loss to surrounding gas molecules as the pressure increases beyond a certain level.

FIG. 2 further shows that in some embodiments, a relatively efficient operation of a SWNT-based detector (such as an infrared (IR) bolometer) can be achieved by providing a modest vacuum where the pressure is lower than approximately 1 mTorr. Such a vacuum condition is relatively easy to achieve, and can be implemented in a known manner.

It will be understood that the example operating threshold pressure described above in reference to FIG. 2 can depend on a particular configuration of the SWNT film. For example, geometry and/or the composition of the film may affect such a threshold operating pressure. Thus, it will be understood that other operating pressure configurations are possible.

FIG. 3 shows an example photo-response 122 of a suspended SWNT film as a function of chopping frequency of incident radiation. An inset in FIG. 3 also shows an example photo-response time-trace 124 of the chopped incident radiation (square-wave modulated) having a chopping frequency of about 2.5 Hz.

It will be understood that the example rise time described above in reference to FIG. 3 can depend on a particular configuration of the SWNT film. For example, geometry and/or the composition of the film may affect rise time. Thus, it will be understood that other rise times and/or detector operating frequencies are possible.

As shown, one can see that the photo-response 122 decreases significantly when the chopping frequency increases beyond several Hertz. Thus, the example detector is able to respond to the example 2.5 Hz chopped signal in an efficient manner. Moreover, the time-trace 124 shows that the SWNT film based detector responds with a rise time of about 50 ms. Such responses are typical for a bolometric device.

FIG. 4 shows an example of a resistance curve 126 as a function of the temperature of the SWNT film (top), and the corresponding resistance-change (dR) curve 128 also as a function of temperature (bottom). Such resistance characteristics correspond to an example SWNT film that is approximately 1 µm thick and formed from substantially purified SWNTs. As shown by the curve 126, there is a minimum in resistance at temperature of about 230K from a metallic behavior observed at higher temperatures to a semiconducting behavior at lower temperatures. Corresponding resistance-change (dR) plot 128 shows that the slope of the resistance curve 126 changes sign at the example temperature of about 230K.

In some embodiments, the foregoing example resistance characteristics are in agreement with a bolometric response of the detector. In a detector element where photo-carriers contribute directly to the photoconductivity, the resistance would decrease irrespective of the sign of temperature coefficient of the resistance.

In some embodiments, a thin film of SWNTs, such as the example 1 µm-thickness film of FIG. 4 having the bolometric properties, can be configured to enhance the bolometric properties. For example, the film can suspended as described herein to minimize the thermal coupling of the SWNT film with the other structures of the detector. Moreover, the film can be maintained at a low pressure environment (for example, a vacuum with pressure less than about 1 mTorr) to reduce thermal coupling with the film's surrounding.

Figure 5:
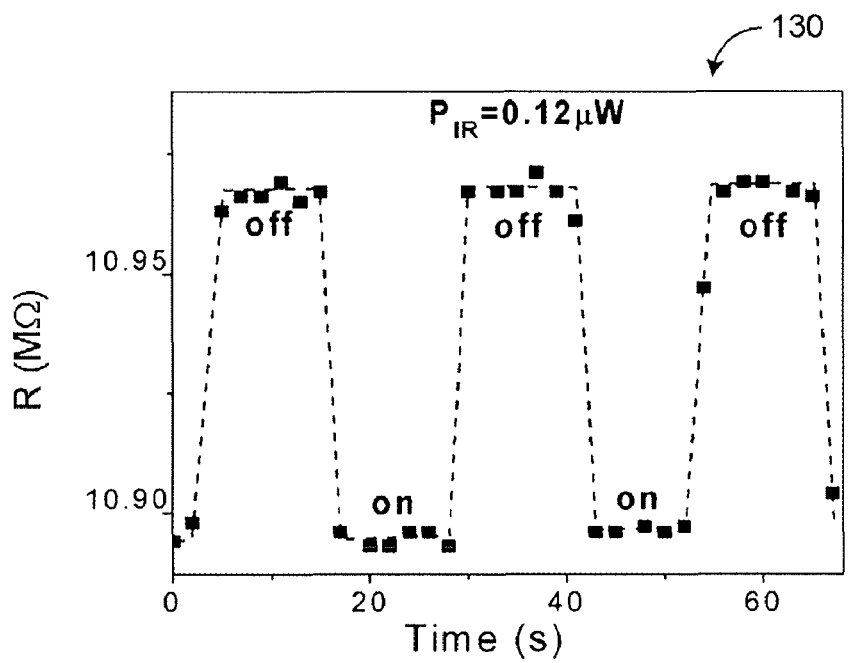
FIG. 5 shows an example bolometric response of a SWNT film, by way of resistance measurement, to incident modulated radiation power.

FIG. 5 shows an example photo-response of an example embodiment of a SWNT film based bolometer. In this example, the film is suspended and maintained at a temperature of about 50K. The suspended film is subjected to pulses of infrared radiation (at about 0.12 µW power) having a wavelength of about 940 nm and modulated at a frequency of about 0.04 Hz which is within the example bolometric response characteristic as described above in reference to FIG. 3. With such an operating configuration, the resistance of the film is shown to be modulated between about 10.89 MΩ (when power is applied) and about 10.97 MΩ (when power is off), with the difference in resistance being about 1%. Such photo-response is easily detectable with a signal-to-noise ratio of about 100.

In another example, the film is also suspended, and maintained at a temperature of about 150K. The suspended film is subjected to pulses of infrared radiation (at about 4 μW power) having a wavelength of about 940 nm and modulated at a frequency of about 0.04 Hz which is within the example bolometric response characteristic as described above in reference to FIG. 3. With such an operating configuration, the resistance of the film is shown to be modulated between low (when power is applied) and high (when power is off) values, with the difference in resistance being about 3.5%.

In both of the foregoing operating examples, there was no detectable change of resistance when a control experiment was carried out on a SWNT film supported directly on the substrate. It is believed that such lack of detectable photo-response is due to loss of heat from the film to the substrate. The foregoing example data are consistent with the very low level of the steady state photoconductivity signal reported previously under much stronger radiation intensity (for example, 5 to 10 orders of magnitude stronger). The foregoing example data are also consistent with the bolometric nature of the strong modulation of the resistance observed in the thermally isolated configuration of the SWNT film (for example, suspended SWNT film).

Figure 6:
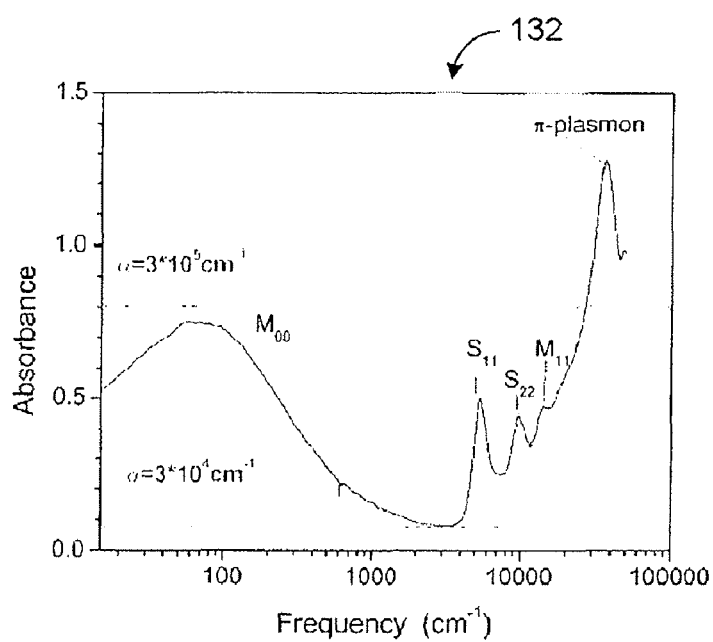
FIG. 6 shows an example absorbance characteristic of a SWNT film, indicating its bolometric property.

In some embodiments, an important characteristic of a detector sensor element can include its ability to efficiently absorb IR radiation in a spectral range of interest, and its temperature coefficient of resistance (TCR), which together allows efficient conversion of the incident radiation power into an electrical signal. FIG. 6 shows an example spectral dependence of the absorbance 132 of a semitransparent SWNT film having a thickness of approximately 70 nm. A spectrum from UV to far-IR (approximately 55,000 to 10 $cm^{-1}$) is shown. As shown, at high energies, the UV part of the spectrum 132 is dominated by the π-plasmon peak characteristic of graphitic structures, whereas the SWNT interband transitions are apparent in the IR region of the spectrum.

As further shown in FIG. 6, $S_{11}$ and $S_{22}$ transitions are believed to originate from the interband transitions of the semiconducting SWNTs, whereas $M_{11}$ and $M_{00}$ transitions are believed to be assigned to the metallic SWNTs. Thus absorptions by SWNT films can cover a wide spectral range which can encompass UV, visible, near-IR, mid- and far-IR parts of the spectrum. Absorption coefficient can be in a range α, of approximately $3\times10^4$ to $3\times10^5$ $cm^{-1}$. In some embodiments, these absorption coefficients can be comparable with values observed in the fundamental absorption edge in certain semiconductors. In some embodiments, certain extrinsic semiconductors that are utilized for detection of far-IR radiation can have extinction coefficient about two to three orders of magnitude lower than that for the SWNTs. Thus, even very thin films of SWNTs can have relatively high absorption over a wide spectral range. In certain embodiments, such high absorption can be an important characteristic for the sensitive element of a detector such as a bolometer.

Based on the foregoing non-limiting example properties of SWNT films, one can see that SWNT films can be used as a sensor element of a bolometer for measuring energy. In some embodiments, the radiation power measurement involves electromagnetic radiation, including IR radiation. As discussed above, other portions of the electromagnetic spectrum can also be measured. In some embodiments, the energy measurement can also involve energetic particles such as sub-atomic particles. Deposition of energy by such particles in the SWNT film can result in a temperature increase that can be measured electrically.

Figure 7:
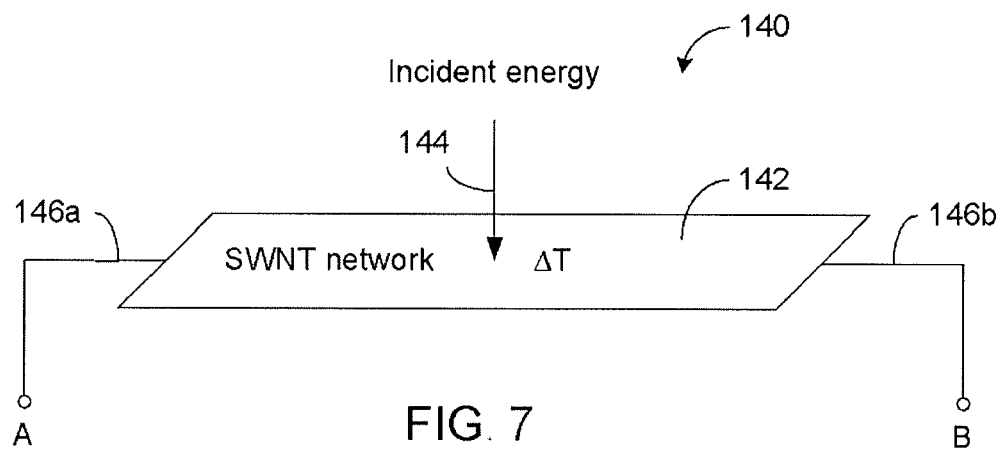
FIG. 7 shows an example electrical circuit configuration for measuring a change in an electrical parameter in response to a bolometric change in temperature of the SWNT film.

FIG. 7 depicts an example embodiment of a SWNT network based sensor element 140 that can provide one or more features of the foregoing bolometric capability. An incident energy 144 (electromagnetic radiation and/or energetic particles) is depicted as being received by a SWNT film 142. At least some of the incident energy 144 can be absorbed by the film 142 so as to result in an increase in the temperature (ΔT) of the film 142. Such increase in temperature can result in a change in electrical property (such as resistance) of the film 142, and such a change can be measured via electrical contacts 146a and 146b at points "A" and "B."

Figure 8A:
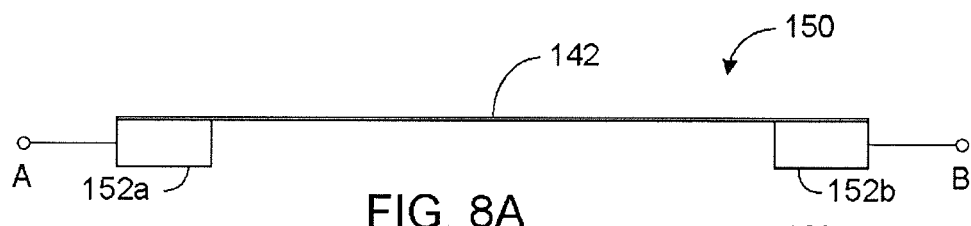
FIGS. 8A-8C show some non-limiting examples of how the thermal coupling between the SWNT film and a supporting structure can be reduced.
Figure 8B:
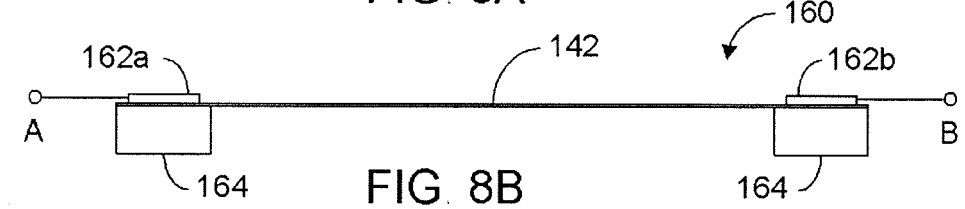
Figure 8C:
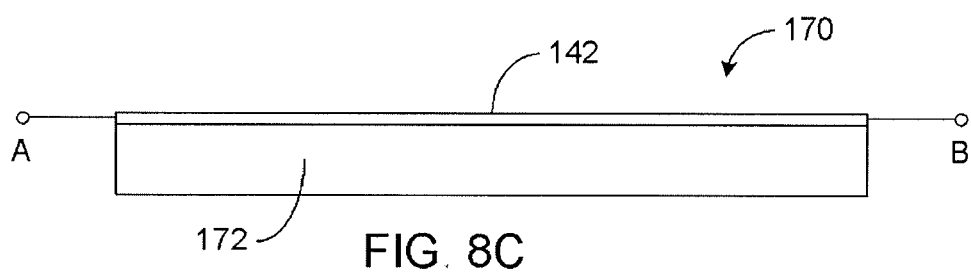

FIGS. 8A-8C show some example embodiments where the SWNT film 142 can be configured to reduce its thermal coupling with other structure(s). As discussed above, one way to achieve such thermal isolation is by suspending the film 142. Thus, as shown in FIG. 8A, some embodiments can have the film 142 suspended between two supports 152a and 152b. In some embodiments, the supports 152a and 152b can also function as electrical contacts for the film 142.

FIG. 8B shows another example embodiment 160 where the film 142 can be suspended between one or more support locations. In the example shown, the film 142 is depicted as being supported at its ends by a support structure 164. In some embodiments, such as the example shown in FIG. 8B, electrical contacts 162a and 162b can be separate from the support structure. Thus, the film 142 is shown to be positioned on the support structure 164, and the electrical contacts 162a and 162b are shown to be formed on top of the film 142.

FIG. 8C shows that in an example embodiment 170, the film 142 does not necessarily need to be suspended. If a supporting substrate 172 can provide sufficient thermal isolation without acting as a heat sink in an undesirable manner, then such a material may be used to provide support for the film 142. An example of such thermally-isolating material can include silica aerogel.

Figure 9:
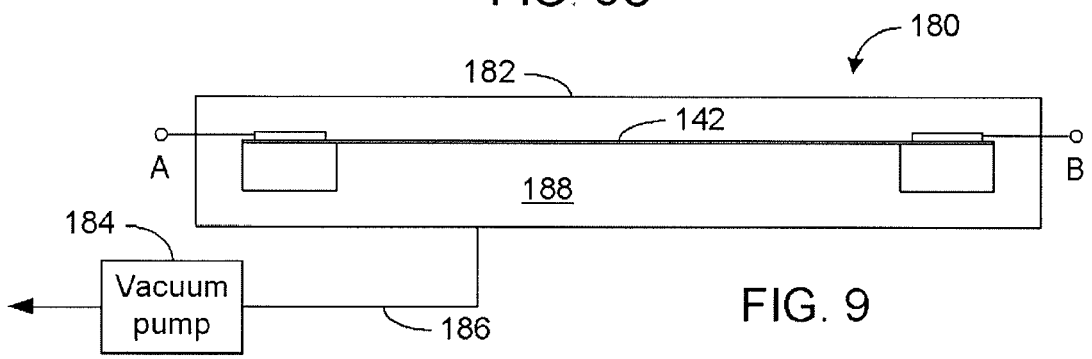
FIG. 9 shows an example embodiment of a vacuum system that can provide a vacuum condition about the SWNT film to reduce thermal coupling of the SWNT film and its surrounding.

As described herein, another way of providing thermal isolation of the SWNT film 142 is by reducing the amount of gas molecules about the film 142. Thus, in some embodiments 180 as shown in FIG. 9, a housing 182 can be provided and configured to provide a vacuum environment 188 about the film 142. Such vacuum 188 can be achieved, for example, via a vacuum line 186 and a vacuum pump 184 in a known manner.

FIGS. 10-17 show various embodiments of methods and configurations for fabricating SWNT films having desired properties, and for incorporating such films into detectors. FIGS. 10A-10C show examples of how such fabrication of SWNT film based detectors can be modified at different fabrication stages. In some embodiments as shown in FIG. 10A, a method 190 can include a process block 192 where SWNTs are formed. In a process block 194, a film can be formed from the SWNTs. In a process block 196, a detector can be formed in a selected manner to yield one or more desired detector performance characteristics. Suspending of the film and/or providing vacuum for the film can be examples that can be performed in the detector-configuring process block 196.

In some embodiments as shown in FIG. 10B, a method 200 can include a process block 202 where SWNTs are formed. In a process block 204, a film can be formed from the SWNTs in a selected manner to yield one or more desired film characteristics. Film geometries and compositions can be examples of such selected film forming process. In a process block 206, a detector can be formed using the film.

In some embodiments as shown in FIG. 10C, a method 210 can include a process block 212 where SWNTs are formed in a selected manner to yield one or more desired SWNT characteristics. SWNT geometries and compositions can be examples of such selected SWNT forming process. In a process block 214, a film can be formed from the SWNTs. In a process block 216, a detector can be formed using the film.

It will be understood that the example processes 190, 200, and 210 of FIGS. 10A-10C are described separately to emphasize that the SWNT, SWNT network (such as film), and the detector can be configured in their desired manners at different stages of fabrication. In some embodiments, such selected configurations can be combined in any manner during fabrication of a detector.

In some embodiments, SWNTs can be fabricated by using one or more of known techniques. For example, electric arc discharge technique, laser ablation technique, catalytic vapor deposition technique, HiPco technique or other synthetic techniques for production of carbon nanotubes can be utilized.

FIGS. 11A and 11B show an example of how SWNT films can be fabricated. In some embodiments as shown in FIG. 11A, a SWNT network that can be in a film form can be prepared by placing a grid 400 (for example, a stainless steel wire grids of cell size of approximately 1"×1") inside an electric arc chamber near the electrodes during a SWNT production process. The SWNTs synthesized during the electric arc process drift from the hot zone near the plasma core towards the water-cooled walls. The wire grid 400 nucleates the growth of an extended SWNT network 402. In some embodiments, formation of a continuous semitransparent SWNT film suitable for the sensor element can occur after about 1 to 5 minutes of operation of the electric arc. Such a film is highly pure because it is formed from the carbon nanotubes 402 that are trapped in this web, while typical impurities such as nanoparticles and amorphous carbon penetrate the thin network without becoming entangled. In some embodiments, the thickness of the SWNT network film can be selected by varying the duration of operation of the electric arc.

In another embodiment, a SWNT network can also be formed by dispersing SWNT material in a solvent with use of an ultrasonic bath, followed by vacuum filtration through a membrane (for example 0.2 μm pore size membrane). As an example, a film network of high purity as-prepared (AP)-SWNTs can be prepared by such a filtration method. In some embodiments, the thickness of the SWNT network film can be selected by adjusting the concentration of the SWNT material, and a total volume of the SWNT dispersion for the filtration.

FIG. 11B shows an example embodiment of a formed SWNT film 412. From such a film, one or more strips 412 can be cut so as to yield various shaped detector elements described herein. It will be understood that although the film strips are depicted as being rectangular in shape, any other shapes and patterns are also possible. For example, lithographic and PDMS transfer-printing techniques can be utilized to obtain various shaped films.

Figure 12:
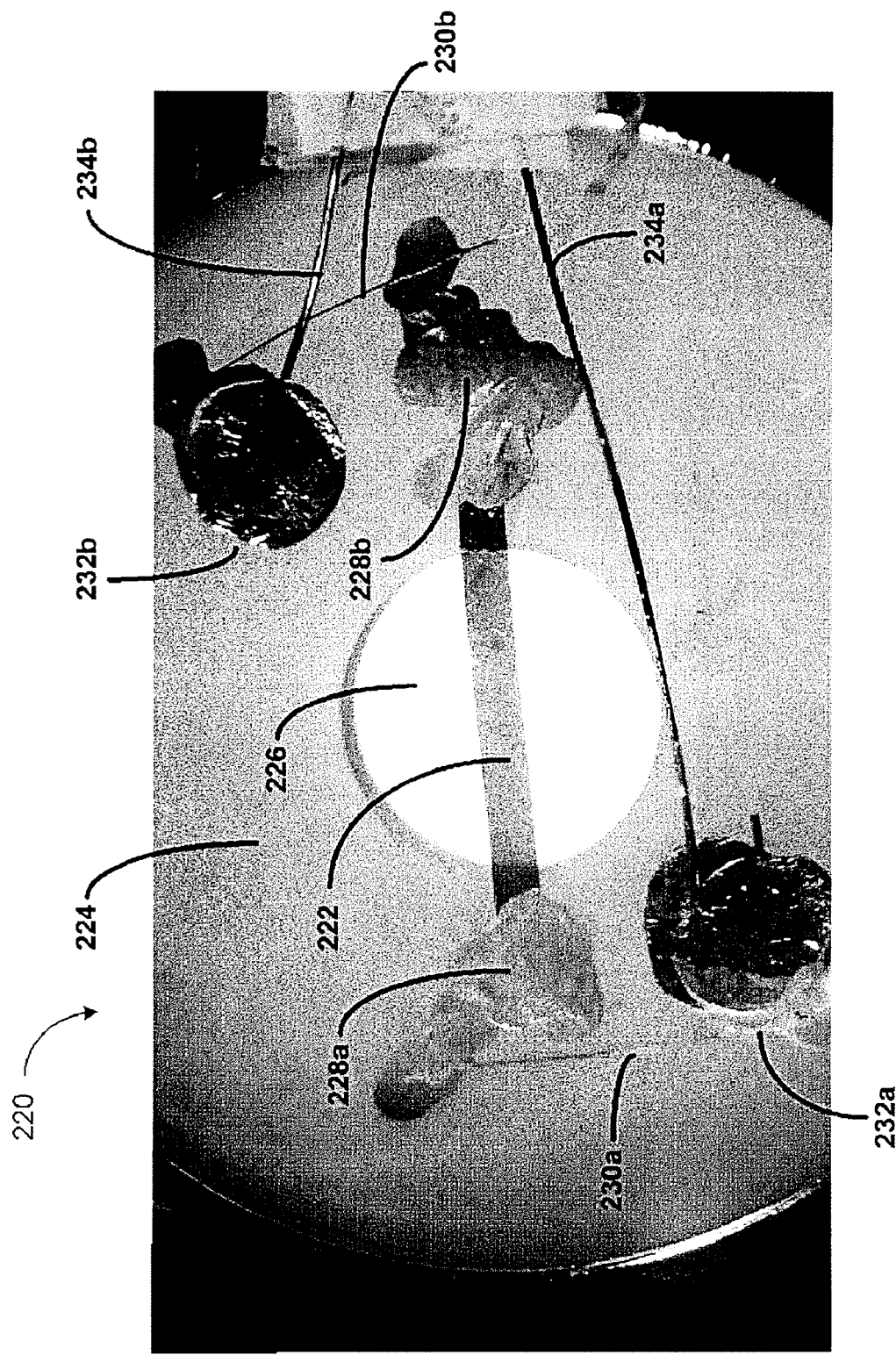
FIG. 12 shows a photograph of an example embodiment of a detector element having a strip of SWNT film.

FIG. 12 shows an example embodiment of a detector 220 where a SWNT film strip 222 is mounted to a support structure 224 so that a substantial portion of the strip 222 is suspended in a space 226 between the support locations. In some embodiments, the support structure 224 is a sapphire ring that is thermally coupled to a cold finger (not shown) of an optical cryostat (not shown). Such a ring structure allows for suspension of the SWNT film strip 222, so that the only significant pathway for heat dissipation of the absorbed radiation power is by heat flow along the film 222 to the ring structure at the support locations (assuming that the detector is maintained at a vacuum condition).

The support structure does not necessarily need to be a single-piece structure; however, one can see that having a single-piece structure such as the example ring facilitates maintenance of a substantially uniform temperature at both of the support locations. Moreover, thermally coupling the ring to the cold finger facilitates maintenance of the support structure at a desired temperature. In equilibrium, the film strip 222 can also be maintained at such a base temperature; and any detected temperature changes due to absorption of radiation power can be relative to the base temperature.

In the example configuration shown in FIG. 12, the SWNT film strip has a dimension of about 4.0 mm (length)×0.5 mm (width), with a thickness of about 100 nm. The opening 226 of the ring 224 has a diameter of about 3.5 mm. Many other configurations are possible. For example, the ring does not necessarily need to be circular in shape. Moreover, the support structure 224 can be formed from any number of materials.

In some embodiments, as further shown in FIG. 12, the film strip 222 can be secured to the support structure 224 via electrically conductive bonds 228a and 228b such as silver paste. Other electrical contact formation techniques, such as thermal or E-beam evaporation, or screen printing techniques, can also be utilized.

In some embodiments, as further shown in FIG. 12, the electrical bonds 228a and 228b can further be electrically coupled to electrical contacts 232a and 232b via wires 230a and 230b. In some embodiments, the wires 230a and 230b can be selected to provide relatively low thermal coupling between the bonds 228 and the contacts 232. For example, thin wires can be used. Electrical contacts with external circuits (not shown) can be formed at the example contact locations 232a and 232b.

Figure 13A:
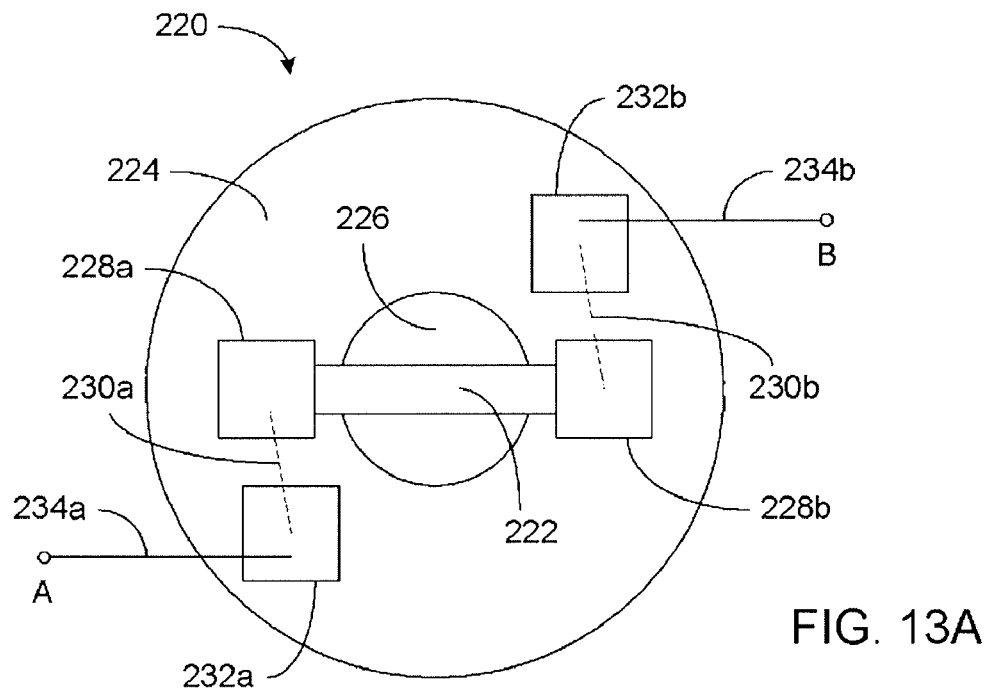
FIGS. 13A and 13B show line drawing representations of the example detector element of FIG. 12.
Figure 13B:
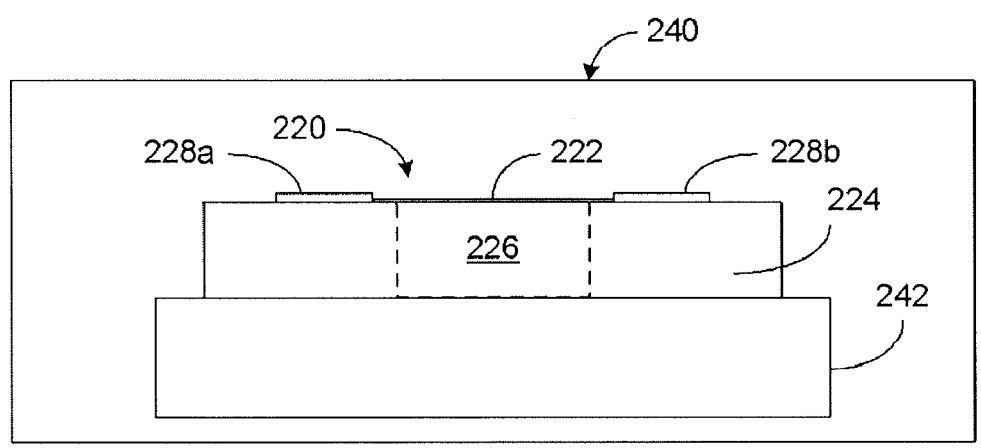

FIGS. 13A and 13B show simplified line drawings of the example configuration described above in reference to FIG. 12. Additionally, FIG. 13A shows that the electrical contacts 232a and 232b can provide the electrical connections "A" and "B" described above in reference to FIG. 7.

Also, in some embodiments as shown in FIG. 13B, the example support structure 224 and the film 222 mounted thereon can be positioned in a housing 240 so as to allow formation of vacuum as discussed above in reference to FIG. 9. In some embodiments, the support structure 224 can be mounted on a mounting structure 242 to facilitate, for example, positioning of the support structure 224 in the housing 240 and/or to facilitate thermal coupling with a controlled external device (for example, a cryostat).

Figures 14, 15:
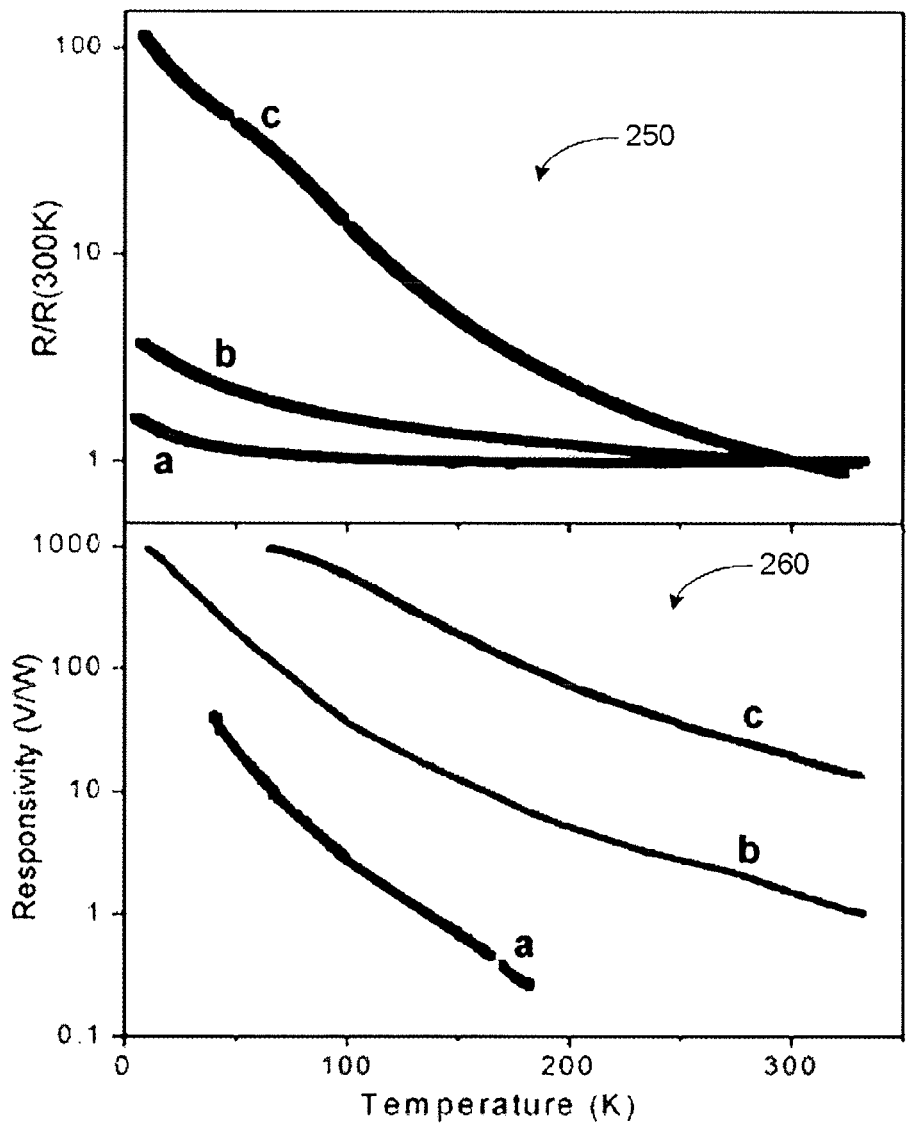
FIG. 14 shows example temperature dependence curves of normalized resistance for three example SWNT films.
FIG. 15 shows example voltage responsivity dependence curves for the three example SWNT films of FIG. 14.
Figure 16:
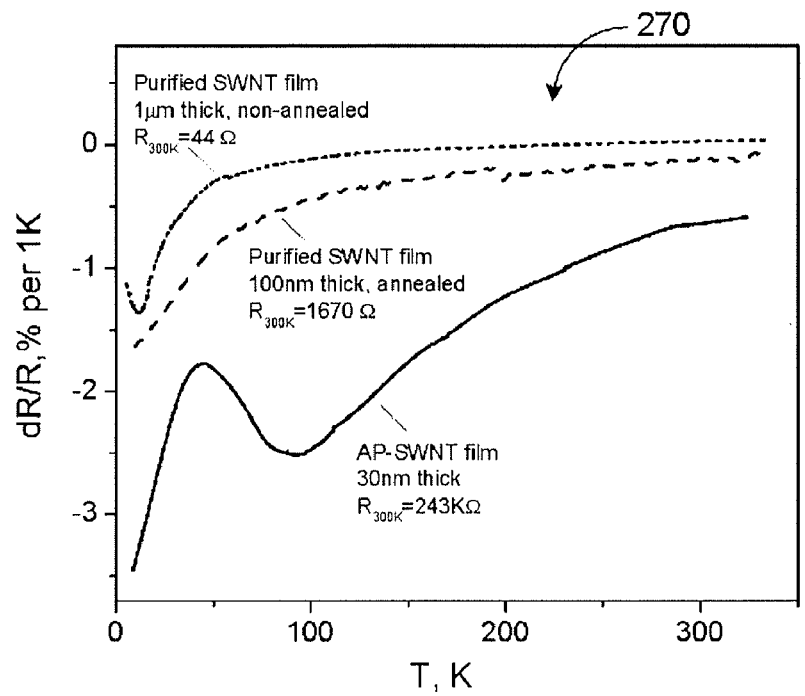
FIG. 16 shows example temperature coefficient of resistance (TCR) curves for the three example SWNT films of FIG. 14.

As described herein, the SWNT network can be configured in various ways to achieve one or more desired properties. FIGS. 14-16 show examples of various properties of different configurations of SWNT films as a function of temperature. Such properties can be used to design a detector having a desired temperature-dependence profile.

FIG. 14 shows example temperature dependence curves 250 of normalized resistance of three example SWNT films. For the purpose of description, the normalized resistance in FIG. 14 refers to resistance R of the film divided by the film's resistance at 300K.

The example curve indicated as "a" corresponds to an approximately 1 μm thick film formed from purified SWNTs. Such a film is shown to have about 70% increase of resistance when the temperature changes from about 330K to about 4.2K. Note that the example film corresponding to curve "a"

is also described above in reference to FIG. 4, where the resistance increases as the temperature decreases below about 230K.

The example curve indicated as "b" corresponds to an approximately 100 nm thick film formed from purified SWNTs and annealed in vacuum at about 670K. By decreasing the thickness to 100 nm and annealing the film, the room temperature resistance of the sensitive element R(300K) increases from about 44Ω to 1670Ω, and the temperature dependence of resistance becomes stronger than that of the thicker and unannealed film (curve "a"). In some embodiments, both change of geometrical factors of the films and physical/chemical processing like annealing can modify temperature dependence of resistance.

The example curve indicated as "c" corresponds to an approximately 40 nm thick film formed from AP-SWNTs. Such a film has a much higher room temperature resistance of about 243 KΩ, and the change in resistance extends more than 2 orders of magnitude between 330K and 4.2K.

FIG. 15 shows example voltage responsivity dependence curves 260 for the three example SWNT films described above in reference to FIG. 14. To obtain the responsivity curves 260, a substantially constant current regime was applied with a DC bias of about 100 mV being applied across the films.

As shown in FIG. 15, the responsivity of a SWNT-based detector can be significantly improved by optimizing the sensitive element geometry and/or SWNT processing conditions. The highest responsivity (about 1000 V/W) among the example three was achieved with the AP-SWNT film. In some situations, however, a film based on the purified SWNTs may be more readily manufactured and can have a greater potential for improvement by modifications to the geometry and/or processing. Furthermore, resistivity of a purified film is typically much lower than that of an AP-SWNT film. Such lower resistance can facilitate a lower noise level which can contribute to the detector's noise-equivalent power (NEP) and detectivity (D*).

FIG. 16 shows example temperature coefficient of resistance (TCR) curves 270 for the three example SWNT films described above in reference to FIG. 14. For the purpose of description, TCR can be expressed as dR/R per degree Kelvin (expressed in percentage).

For the 1 μm thick film formed from purified SWNTs ("a" in FIG. 14), the TCR is relatively low (about 0.01-0.1%) above about 100K with a change in sign at around 230K. Decreasing the thickness to 100 nm and annealing the SWNT film in vacuum at 670 K ("b" in FIG. 14) results in a significantly increased TCR. The AP-SWNT film ("c" in FIG. 14) shows a TCR ranging between about 1 and 2.5% in the 330-100K temperature range. In some embodiments, such a value is comparable with TCR of vanadium dioxide which is a popular thermistor materials used in the fabrication of micromachined silicon bolometers. Thus by varying the geometry, content, and/or processing conditions of the SWNT films, it is possible to significantly improve the TCR of a SWNT film detector element.

In some embodiments, there are number of approaches that can be implemented to obtain desired characteristics in SWNT based detectors. In some embodiments, spectral range of absorption can be varied by utilizing chemical functionalization of SWNTs. Such a feature can allow for fabrication of application-specific detectors.

Figure 17:
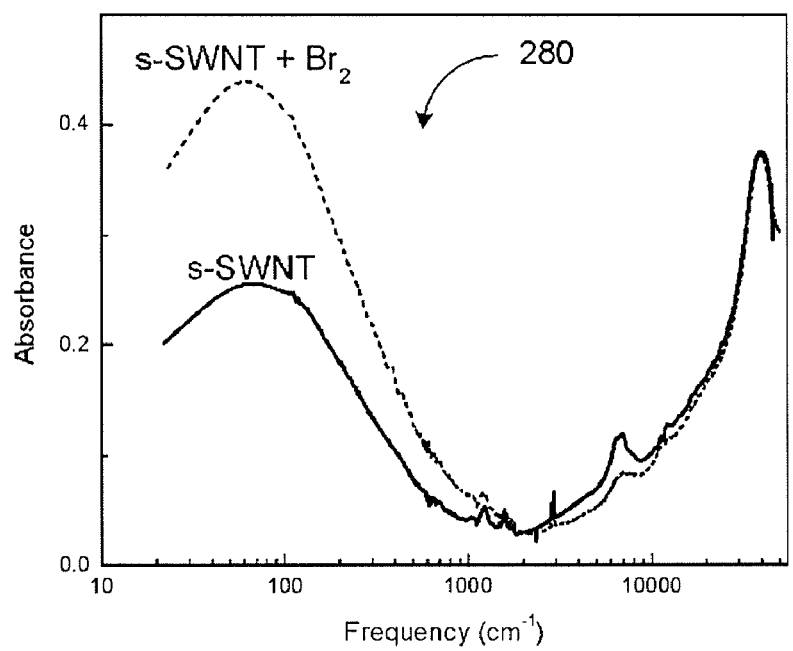
FIG. 17 shows example absorption curves for two example SWNT films.

FIG. 17 shows example absorption curves 280 for two example SWNT films. The lower curve corresponds to an s-SWNT film, and the upper curve corresponds to a doped s-SWNT film. For the example doped s-SWNT film, bromine was used as a dopant. As shown in FIG. 17, one can see that doping with bromine increases the far-infrared absorption of the SWNTs. Other dopings and/or other chemical treatments can also be used to change one or more spectral characteristics of the SWNT films.

In some embodiments, spectral characteristics (for example, absorption characteristics) of the SWNT film can be modified by utilizing SWNTs of different diameter distributions. In some embodiments, other SWNT properties, such as chirality, can also be a basis for obtaining one or more desired spectral characteristics in the SWNT film.

In some embodiments, the temperature coefficient of resistance (TCR) of the SWNT based detector element can also be adjusted (for example, increased) by utilizing the chemistry of SWNTs. For example, TCR can be increased and the temperature range of optimum performance can be shifted towards room temperature by utilizing the chemistry of SWNTs.

In some embodiments, bulk samples of SWNTs can be a mixture of semiconducting and metallic SWNTs, and SWNT films can have a similar mixture. In such mixtures, the dominant contribution to the resistance of the SWNT network is believed to originate from inter-nanotube junctions. These junctions can also dictate the temperature dependence of the resistance curve.

In some embodiments, chemical functionalization of the SWNTs can modify the intra-nanotube conductivity and resistance of inter-nanotube junctions by orders of magnitude, thus allowing for designs based on TCRs that provide desired detector performance.

In some embodiments, a SWNT network can be fabricated using substantially all semiconducting SWNTs so as to yield high TCR values in a temperature range between about 100K and 300K.

In some embodiments, thermal conductivity of SWNT films can be optimized by utilizing SWNT chemistry. In certain configurations, an individual SWNT can have a very high thermal conductivity (for example, 3000-6000 W/(m*K)); and such high thermal conductivity can detract from bolometric performance. In certain SWNT networks, the thermal conductivity can be reduced to values of about 10-100 W/(m*K) mostly due to the contribution of inter-nanotube junction resistance. In certain SWNT networks, the thermal conductivity can be further reduced by chemically modifying the inter-nanotube junctions.

Figure 18:
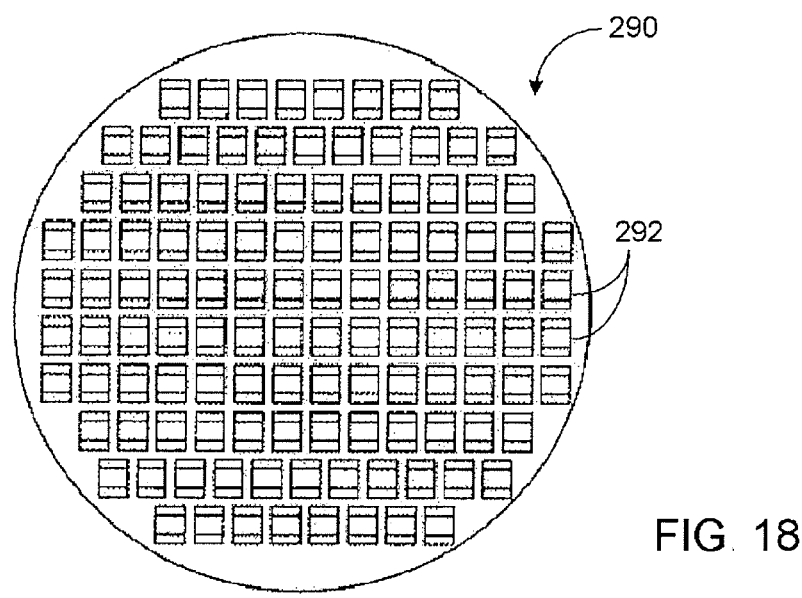
FIG. 18 shows an example embodiment of an array having a plurality of SWNT based detector elements.

FIG. 18 shows an example embodiment of an array 290 having a plurality of SWNT film detector elements 292. Each of the elements 292 can be configured as described herein.

In some embodiments, the array 290 of detectors 292 (for example, IR detectors) can be fabricated from a single SWNT film. A relatively large-area and substantially homogeneous SWNT film for such an array can be prepared by, for example, vacuum filtration. For example, filtration of SWNT suspension through approximately 90 mm or 135 mm filter membranes can yield a relatively large SWNT film. The resulting SWNT free-standing film can be placed on a pre-wired platform with micromachined or lithographically fabricated wells to suspend individual sensitive elements.

In some embodiments, flexible arrays of SWNT detectors can also be fabricated by placing the free-standing SWNT film on a flexible panel or by spraying technique.

Figure 19A:
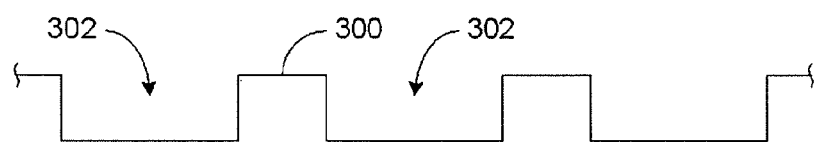
FIGS. 19A-19C show an example method for fabricating the array of FIG. 18.
Figure 19B:
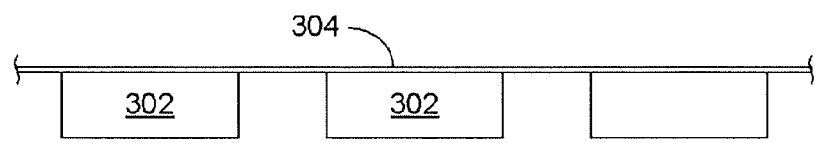
Figure 19C:
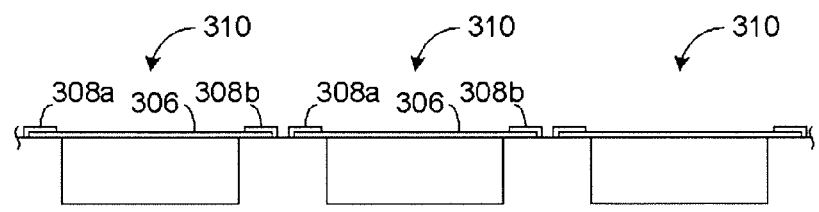

FIGS. 19A to 19C show an example fabrication process for an example embodiment of the array 290 described above in reference to FIG. 18. In FIG. 19A, a plurality of wells or cells 302 are shown to be defined by a substrate 300. In some embodiments, such wells can be fabricated as part of the array fabrication. In some embodiments, a pre-fabricated substrate with wells can be used for formation of detector elements.

FIG. 19B shows that in some embodiments, a SWNT film 304 can be positioned above the wells 302 such that portions of the film 304 are suspended over the wells 302. FIG. 19C shows that in some embodiments, individual detector elements can be formed by, for example, electrically partitioning the film 304 into a plurality of film elements 306 and forming electrical contacts 308 for the film elements 306. In such an example configuration, each individual film element 306 is suspended over the well 302 so as to reduce thermal coupling with the substrate 300.

In some embodiments, the substrate 300 can be temperature controlled as described herein. Also, the array of the detector elements can be placed in a vacuum condition to reduce heat loss from the film elements.

As described herein, various embodiments of SWNT films (and/or other nanotube based structures, including structures that include two or more walled nanotubes) can function as sensitive elements for thermal detectors. In some embodiments, such films can have extremely high absorption coefficient, especially in the near-, mid- and far-infrared spectral ranges. In some embodiments, such films can also have very low mass (in the order of nanograms), thus providing very low heat capacity for fast and efficient transfer of absorbed IR radiation into the temperature modulation of resistivity. The temperature modulation can be efficiently transferred into an electrical signal by configuring the SWNT film to have desired TCR, and such configurations can be achieved modifying, for example, the geometry and/or chemistry of SWNTs and/or films.

In some embodiments, the SWNT-based detectors described herein can be configured to detect and measure infrared radiation. Some non-limiting applications can include high performance and low cost 2D-arrays for thermal imaging, spectroscopy, and space infrared telescopes.

A wide variety of variations are possible. For example, additional structural elements may be added, elements may be removed or elements may be arranged or configured differently. Similarly, processing steps may be added, removed, or ordered differently. Accordingly, although the above-disclosed embodiments have shown, described, and pointed out the novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. An infrared (IR) detector, comprising:
   a sensor element comprising a thin film of single-walled carbon nanotubes (SWNTs) suspended between electrical contacts.

2. The detector of claim 1, wherein said SWNTs are treated with one or more dopants or other materials to increase or reduce an absorption property of said SWNTs to a selected frequency of infrared radiation.

3. The detector of claim 1, further comprising a detector-housing configured to facilitate control of pressure or temperature about said suspended thin film so as to increase or reduce the sensor element's sensitivity to infrared radiation.

4. An infrared (IR) detector array, comprising:
   a plurality of sensor elements arranged in an array, each sensor element comprising a thin film of single-walled carbon nanotubes (SWNTs) suspended between electrical contacts.

5. A device, comprising:
   a film formed from a plurality of carbon nano-structures, said film suspended between first and second electrical contacts to allow measurement of change in an electrical property of said film in response to a change in temperature of said film.

6. The device of claim 5, wherein said change in temperature results from absorption of infrared radiation, and said electrical property comprises resistance of said film between said first and second electrical contacts.

7. The device of claim 5, wherein said plurality of carbon nano-structures comprise single-walled carbon nanotubes.

8. The device of claim 5, wherein said plurality of carbon nano-structures comprise at least some double-walled carbon nanotubes.

9. The device of claim 5, wherein said single-walled carbon nanotubes comprise substantially purified single-walled carbon nanotubes.

10. The device of claim 5, wherein said single-walled carbon nanotubes comprise annealed single-walled carbon nanotubes.

11. The device of claim 5, wherein said film includes one or more dopants.

12. The device of claim 5, wherein said film has an average thickness that is less than or equal to approximately 1 micron.

13. A bolometer for measuring incident energy, comprising:
   a detection element comprising a film formed from a plurality of single-walled carbon nanotubes (SWNTs), wherein said film is configured to experience a change in temperature resulting from absorption of at least a portion of said incident energy and wherein said detection element is configured so as to substantially minimize thermal coupling between said film and its surrounding; and
   an electrical circuit coupled to said detection element and configured to measure a change in an electrical resistance of said film resulting from the change of temperature of said film in response to absorption of at least a portion of said incident energy.

14. The bolometer of claim 13, wherein said SWNTs comprise a mixture of semiconducting and metallic SWNTs, wherein said mixture can be adjusted to obtain a desired temperature dependence of said electrical resistance.

15. The bolometer of claim 13, wherein said SWNTs comprise substantially all semiconducting SWNTs so as to allow electrical resistance based operation of said detection element in a temperature range between about 100 K to 300 K.

16. The bolometer of claim 13, wherein said film comprises a network of SWNTs.

17. The bolometer of claim 16, wherein said film has a selected average thickness that provides a desired electrical resistance change for a given change in temperature of said film.

18. The bolometer of claim 16, wherein said film comprises a selected type of SWNTs to provide a desired electrical resistance change for a given change in temperature of said film.

19. The bolometer of claim 18, wherein said film comprises substantially purified SWNTs.

20. The bolometer of claim 18, wherein said film comprises substantially purified SWNTs that are vacuum-annealed.

21. The bolometer of claim 18, wherein said film comprises chemically functionalized SWNTs.

22. The bolometer of claim 18, wherein said film comprises graphene nanoparticles.

23. The bolometer of claim 18, wherein said film comprises SWNTs and graphene nanoparticles.

24. The bolometer of claim 18, wherein said film comprises as-prepared SWNTs (AP-SWNTs).

25. The bolometer of claim 13, wherein said detection element is patterned using lithography, PDMS transfer-printing techniques, or other technique so as to substantially minimize thermal coupling between said film and its surrounding.

26. The bolometer of claim 13, wherein said film is suspended between first and second support locations so as to reduce transfer of heat between said film and said surrounding.

27. The bolometer of claim 26, wherein said first and second support locations also provide first and second electrical contacts for measuring said electrical parameter.

28. The bolometer of claim 13, wherein said surrounding comprises a low pressure environment where the pressure is less than approximately 1 mTorr.

29. The bolometer of claim 13, wherein thermal conductivity of said film is adjustable by chemically modifying inter-nanotube junctions among said SWNTs.

30. The bolometer of claim 13, wherein said SWNTs include dopants to achieve one or more desired spectral characteristics of said film.

31. The bolometer of claim 30, wherein said dopants include bromine to increase far-infrared absorption by said film.

32. The bolometer of claim 13, wherein said SWNTs have a distribution of diameters, said distribution changeable to achieve one or more desired spectral characteristics of said film.

33. The bolometer of claim 13, wherein said SWNTs have a distribution of chirality, said distribution changeable to achieve one or more desired spectral characteristics of said film.

34. The bolometer of claim 13, wherein said incident energy comprises an incident radiation power.

35. The bolometer of claim 34, wherein said detection element is configured to bolometrically detect incident radiation power associated with electromagnetic radiation.

36. The bolometer of claim 34, wherein said detection element is configured to bolometrically detect incident radiation power associated with infrared (IR) radiation.

37. The bolometer of claim 13, wherein said detection element is configured to bolometrically detect energy associated with an incident particle.

* * * * *